United States Patent [19]

Wilson

[11] 4,352,363
[45] Oct. 5, 1982

[54] COLLAPSIBLE BICYCLE STORAGE ASSEMBLY

[76] Inventor: Ralph A. Wilson, 29500-4 Heathercliff Rd., Malibu, Calif. 90265

[21] Appl. No.: 177,112

[22] Filed: Aug. 11, 1980

[51] Int. Cl.³ .......................... B62H 5/00; B62J 19/00
[52] U.S. Cl. ............................................. 135/7; 211/5
[58] Field of Search .............. 135/7, 4 A, 1 A, 7.1 A, 135/DIG. 1; 52/64, 66, 67, 63; 211/5, 17–22; 248/552; 296/136

[56] References Cited

U.S. PATENT DOCUMENTS

| | | | |
|---|---|---|---|
| 639,517 | 12/1899 | Butcher | 211/5 |
| 2,598,940 | 6/1952 | Robie | 135/4 A |
| 2,798,501 | 7/1957 | Oliver | 135/4 A |
| 3,785,500 | 1/1974 | Kennelly | 211/5 |
| 3,863,767 | 2/1975 | Garwood | 211/5 |
| 3,995,649 | 12/1976 | Robichaud | 135/4 A |
| 4,069,833 | 1/1978 | Johansson | 135/4 R |

FOREIGN PATENT DOCUMENTS

| | | | |
|---|---|---|---|
| 806642 | 6/1951 | Fed. Rep. of Germany | 135/7 |
| 1107903 | 5/1961 | Fed. Rep. of Germany | 135/7 |
| 796290 | 4/1936 | France | 211/5 |
| 420542 | 10/1940 | Italy | 135/7 |
| 258495 | 5/1949 | Switzerland | 211/5 |
| 980480 | 1/1965 | United Kingdom | 135/1 A |

Primary Examiner—J. Karl Bell
Attorney, Agent, or Firm—Poms, Smith, Lande & Rose

[57] ABSTRACT

A portable, collapsible bicycle storage assembly for protecting bicycles from weather and theft when left outside. The storage assembly is lightweight and easily disassembled thereby rendering it highly portable. The storage assembly includes a framed structure having at least one bicycle support for supporting bicycles in an upright position. The bicycles may be locked to the bicycle support and thereby locked to the frame structure. Further, a collapsible cover is mounted on the frame structure for entirely covering and enclosing bicycles when they are in place in their respective bicycle supports. The cover includes easily disassembled lightweight cover supports and a lightweight plastic cover to thereby enhance the portability of the storage assembly.

6 Claims, 5 Drawing Figures

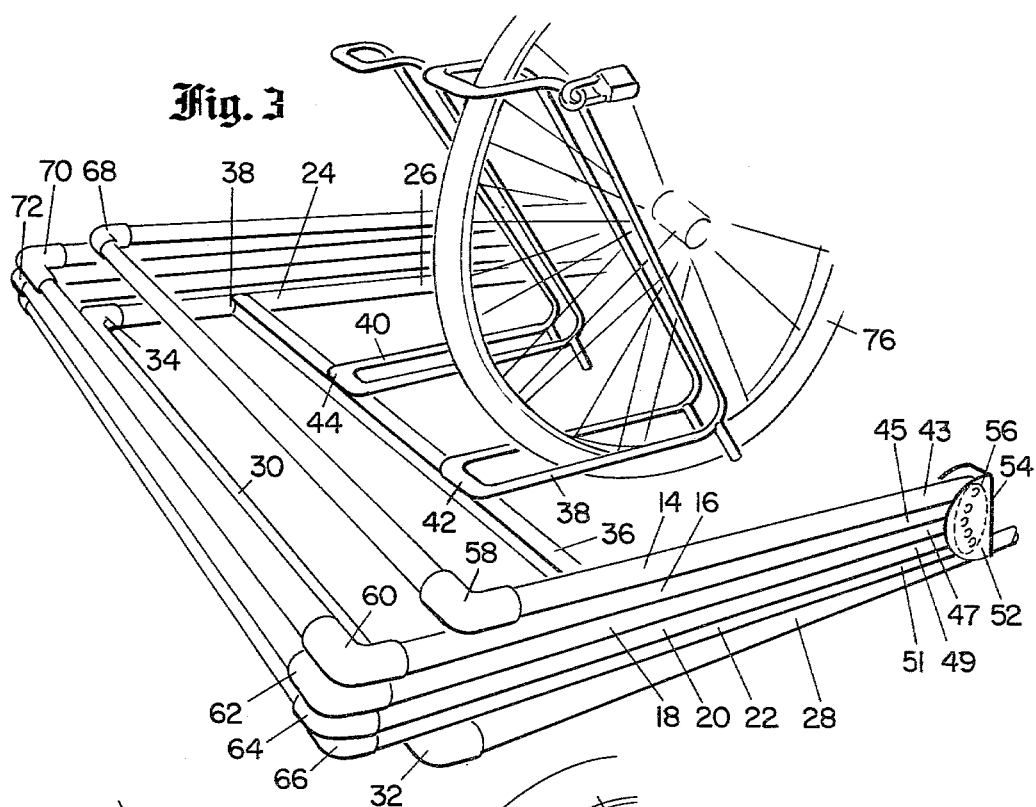
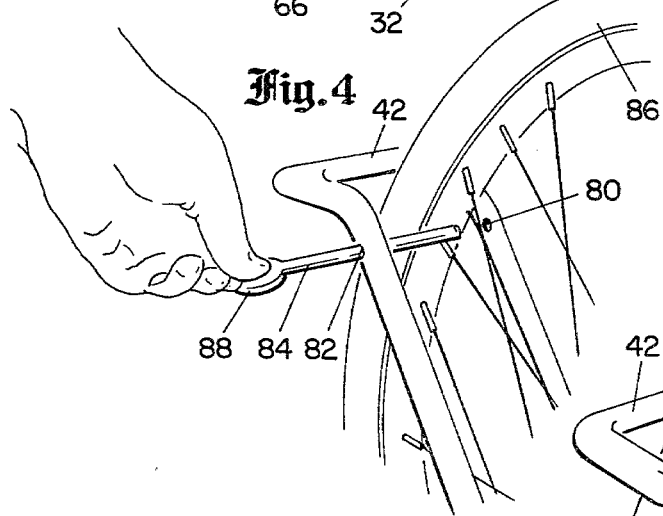
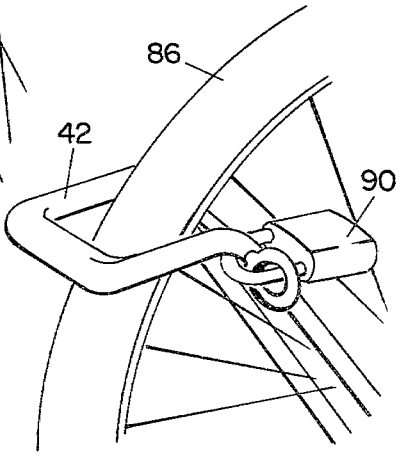

COLLAPSIBLE BICYCLE STORAGE ASSEMBLY

BACKGROUND OF THE INVENTION

The present invention relates generally to structures for storing bicycles when they are kept outside. More specifically, the present invention relates to bicycle storage assemblies which not only protect bicycles from the environment and casual theft, but also support the bicycle, and are easily disassembled and transported.

In today's energy conservation and physical fitness minded society, bicycling has experienced an explosion in popularity. In recent times, bicycle sales have increased dramatically. Along with the increased popularity of bicycles for conserving energy and promoting physical fitness, there has arisen the practical problem of where to store bicycles when they are not in use.

For many individuals who have garages or other storage sheds available, their bicycle can be conveniently stored in these structures. For individuals not fortunate enough to have access to a garage or storage shed, the only alternative for storing a bicycle is to leave them outside where they are subject to moisture, sun and dirt and other weathering. As anyone who has left a bicycle outside unprotected for any length of time knows, the bicycle begins to rust and otherwise deteriorates rapidly. Further, bicycles left out of doors are many times stolen.

There is therefore a present need for a suitable bicycle storage assembly which covers and provides protection for bicycles from the elements while at the same time reducing the possibility of the bicycle being stolen. Further, it is desirable that such a bicycle storage assembly would be relatively lightweight and easily disassembled for transportation between different areas where the bicycle is to be protected.

Collapsible storage structures are known for storing and protecting automobiles. For example, U.S. Pat. No. 2,798,501 issued to Oliver in 1957 discloses a collapsible cover for covering autos. Also, Robie in U.S. Pat. No. 2,598,940 issued in 1952 discloses a collapsible cover which is secured to the vehicle. Although these covers are suitable for use with automobiles, they do not provide for the problems inherent in storing bicycles outside, i.e. the ease with which a bicycle may be stolen if not properly locked.

Other collapsible covers are also known for use as tents and portable shelters for housing people when out of doors. Exemplary of such collapsible tents or shelters are U.S. Pat. Nos. 3,995,649 and 4,069,833 issued to Robichaud and Johansson respectively. Again, although these shelters serve well their intended purpose, they are not suited for use in protecting bicycles, since they do not provide for the locking of bicycles to a suitable support structure to prevent theft.

SUMMARY OF THE INVENTION

It is therefore an object of the present invention to provide a collapsible bicycle storage assembly which not only has a collapsible cover which may be used for covering the bicycle but which also includes a support structure for supporting bicycles in their upright position. Further, it would be desirable to provide a means for locking or otherwise securing the bicycle to the storage assembly to reduce the possibility of theft.

Another object of the present invention is to provide a collapsible bicycle storage assembly which is relatively lightweight and is easily disassembled for transportation from place to place.

A further object of the present invention is to provide a collapsible bicycle storage assembly which completely covers the bicycle to not only prevent rain, wind, and dirt from contacting the bicycle, but also to effectively hide the bicycle from view to again reduce the possibility of theft.

The above objects and others are accomplished, in accordance with the present invention by the provision of a collapsible bicycle storage assembly which includes a frame structure having a horizontal base which has two outwardly extending legs mounted at right angles to at least one cross piece. The frame structure further includes at least one bicycle support for supporting bicycles in the upright position. Further, lock means associated with the bicycle supports is provided for locking the bicycle to the frame and thereby securing the bicycles in place. Mounted on the frame structure is a collapsible cover which is movable between a collapsed position in substantially the same plane as the horizontal base and a covering position wherein the bicycles are completely enclosed within the cover.

In accordance with a further feature of the present invention, the cover is supported by U-shaped cover supports which are mounted on hubs located at midportions of the frame base legs. These cover supports may be rotated to a position where they are adjacent each other to collapse the cover or they may be fanned out in spaced relationship to place the cover in the covering position over the bicycles.

A further feature of the present invention includes means for quickly disassembling the entire structure for easy and convenient transportation.

These and other features and attendant advantages of the present invention will become apparent as the invention becomes better understood by reference to the following detailed description when considered in conjunction with the accompanying drawings.

BRIEF DESCRIPTION OF THE DRAWINGS

FIG. 3 is a detailed view of the preferred exemplary embodiment of the present invention with the cover removed and a bicycle locked in place;

FIG. 4 is a detailed view of the preferred means for locking a bicycle to the frame structure; and FIG. 5 is a detailed view showing a bicycle locked to the frame structure.

DETAILED DESCRIPTION OF THE INVENTION

Figure 1:
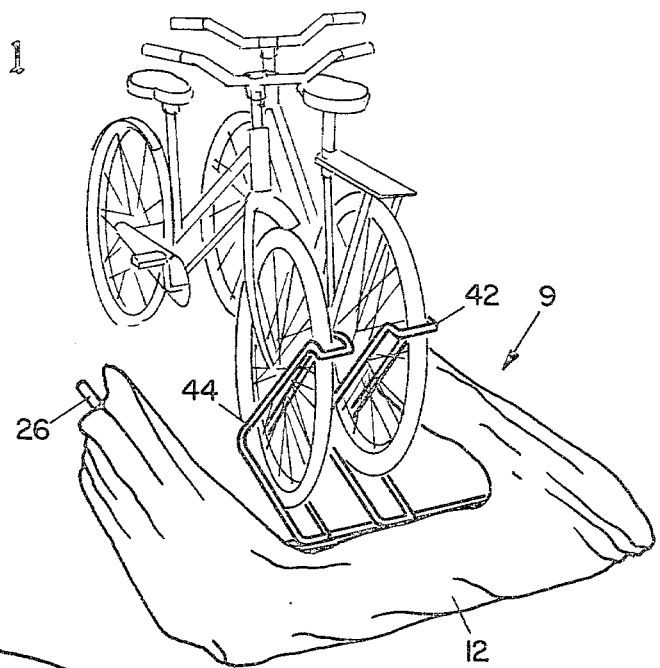
FIG. 1 is a general perspective view showing a preferred embodiment of the present invention with the cover in the collapsed position and bicycles locked in place.
Figure 2:
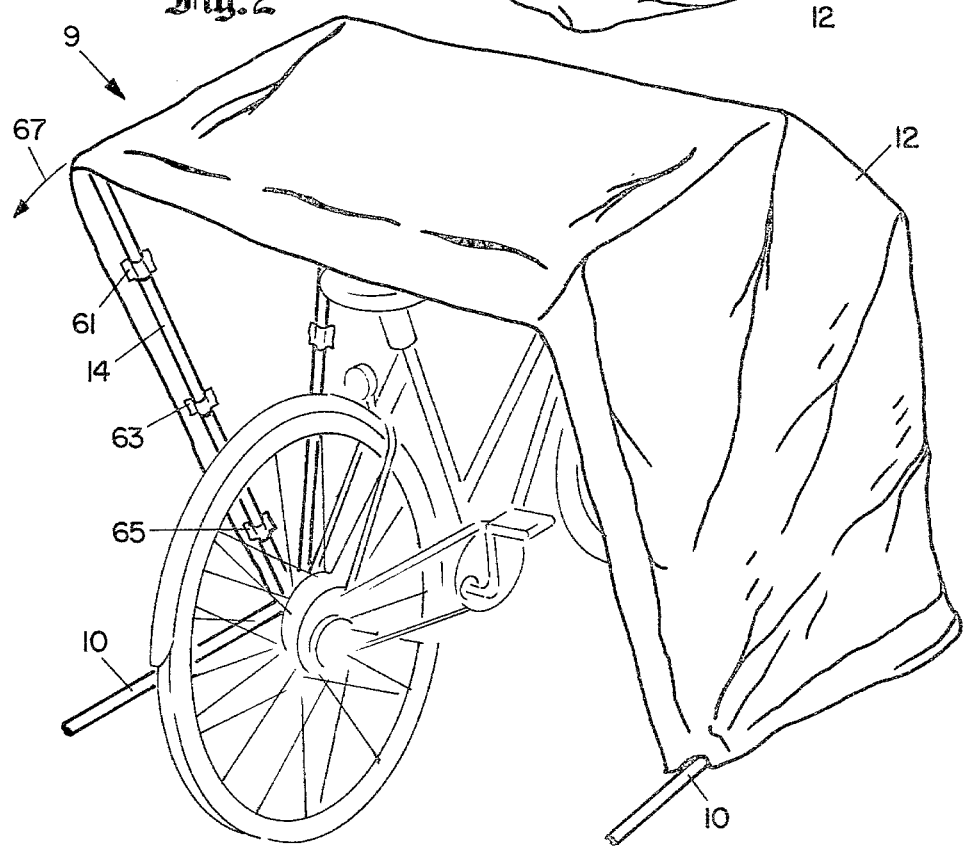
FIG. 2 is another general view of the preferred embodiment of the present invention showing the cover partially covering a bicycle.

A preferred collapsible bicycle storage assembly in accordance with the present invention is shown generally in FIGS. 1 and 2 at 9. As best shown in FIG. 2, the storage assembly includes a frame structure 10, a cover 12 and cover supports 14, 16, 18, 20 and 22 (cover supports 18, 20 and 22 are best shown in FIG. 3).

Referring now to FIG. 3, the frame structure includes a horizontal base 24 which has outwardly extending legs 26 and 28. A cross piece 30 is connected at right angles between legs 26 and 28. Preferably, the legs 26 and 28 and cross piece 30 are pieces of pipe such as steel pipe or more desirably common sprinkler pipe made from polyvinyl chloride. The diameter of the pipes utilized for the base 24 is not particularly important; however, to provide suitable strength, the polyvinyl chloride (PVC) pipe should be between ½ and 1 and ½ inches in diameter. The legs 26 and 28 and cross piece 30 are connected by suitable elbow joints 32 and 34. The elbow joints 32 and 34 are standard right angle plumbing connectors which may be made of metal or polyvinyl chloride or any other suitable plastic. The legs 26 and 28 and cross piece 30 may be secured within elbow joints 32 and 34 by gluing or other means. Alternatively, the legs 26 and 28 and cross piece 30 may be snugly fit into elbow joints 32 and 34 without gluing or other permanent attachment to allow disassembly of base 24 if desired.

A second cross piece 36 extends between the two legs 26 and 28. The cross piece 36 is a square metallic rod or tube which may be clamped or otherwise secured to leg 26 as at 38 and secured to leg 28 (not shown). Alternatively, if desirable, the cross piece 36 may be constructed of pipe such as that used for the leg and cross piece portions with the insertion of a standard T-coupling to provide mounting of the cross piece 36 to the legs 26 and 28. The square metal cross piece is preferred since it provides a suitable strong surface for attaching bicycle support means to the base 24.

Bicycle support means as contemplated by the present invention are provided by support frames 38 and 40. The support frame 38 and 40 are attached to the second cross piece 36 at 42 and 44 respectively by way of bolts, screws, welding or the like. The support frames 38 and 40 are formed from suitable tubular metal stock and are shaped to provide a frame or support to maintain the wheel of the bicycle and the entire bike in an upright position. This type of support frame for bicycles is well known and commonly found on bicycle racks. The particular shape of the support frames 38 and 40 is not critical so long as the frame is shaped to support the bicycle in an upright position and to allow the installation of suitable lock means thereon as described below.

The cover supports 16, 18, 20 and 22 are also preferably formed from a lightweight pipe material such as polyvinyl chloride or other suitable plastic. This type of plastic pipe is low cost, light weight and is commonly used in low pressure plumbing systems, such as lawn sprinkler systems. The diameter of the pipe used may be of the same size as the pipe used for the base or may be of a smaller size if desired. The cover supports 14, 16, 18, 20 and 22 all have first ends 43, 45, 47, 49 and 51 which are hinged to base leg 28 by way of hub 52. The other ends of cover supports 14, 16, 18, 20 and 22 are likewise connected to base leg 26 by way of an identical hub (not shown). The following description of hub 52 and its connection to the ends 42, 44, 46, 48 and 50 of the cover supports and its connection to base leg 28 is also intended to cover the description of the hub on the other ends of the cover supports which mounts them on base leg 26. The hub 52 is hinged or otherwise attached to base leg 28. As shown in FIG. 3, when the cover supports are in the collapsed position adjacent each other and all substantially in the same plane as the base 24, the hub 52 is rotated about its hinged support 52 to the position shown. When the cover supports 14, 16, 18, 20 and 22 are fanned out to spaced positions when the bicycles are covered, the hub 52 rotates so that bottom portion 54 is rotated into a position laying flat on top of base leg 28.

The cover supports 14, 16, 18, 20 and 22 are attached to the hub 52 by suitable cotter pins, bolts or other suitable fastening rods as shown generally at 56. Fastening the cover supports 14, 16, 18, 20 and 22 to the hub 52 in this manner allows the cover supports to be opened up much like a fan to provide support for the cover 12 when it is in place covering bicycles. The cover supports 14, 16, 18, 20 and 22 are made up of three pieces which are connected together on one side by elbow joints 58, 60, 62, 64 and 66, and on the other side by elbow joints 68, 70 and 72 for cover supports 14, 16, and 18 respectively with the elbow joints used for securing the cover support pieces for cover supports 20 and 22 not being shown. The support pieces may be glued or otherwise permanently bonded within the elbow joints; however, it is preferred that the pieces be only snugly inserted into the joints so that they may be removed for disassembly if desired.

The cover 12 is provided for covering and protecting the bicycles. The cover 12 may be made of any suitable fabric such as canvas or any of the numerous synthetic plastics available. Preferably the cover 12 is made from a lightweight plastic material which is weather resistant. As best shown in FIG. 2, the cover 12 may be fastened to the cover supports by any suitable fasteners such as those shown at 61, 63 and 65. Although only fasteners 61, 63 and 65 are visible, the cover 12 is likewise attached to the cover supports 14, 16, 18 20 and 22 at other various suitable positions. Any suitable type fastener such as snaps or buckles or belts may be utilized to tie the cover 12 to the cover supports. However, it is preferred that the fasteners be easily released.

Although in FIG. 2, the cover 12 is shown only partially closed over the bicycle, the cover can be, if desired, pulled fully forward as indicated by arrow 67 to completely cover the bicycle. Further, suitable clamps or locks may be provided to lock the cover into place to prevent unwanted opening of the cover.

Referring now to FIG. 4, lock means, as particularly contemplated by the present invention, includes holes 80 and 82 through which lock bar 84 may be passed to lock wheel 86 to support frame 42. The lock bar 84 has a ring-shaped head 88 which is locked to the support frame 42 with padlock 90 as shown in FIG. 5. Although the lock bar 84 is preferred for use with padlocks such as padlock 90, any other locking bar configuration may be utilized so long as it provides a secure means for locking the bicycle tire 86 to the frame 42 while at the same time being conveniently unlocked and removed when desired.

The preferred exemplary embodiment is shown having two bicycle support frames 38 and 40. Larger storage assemblies having more than two bicycle support frames or smaller storage assemblies having only one bicycle support frame can also be prepared in accordance with the present invention if desired.

Since the bicycle storage assembly of the present invention is preferably made from a lightweight PVC pipe and thin plastic, the storage assembly may be easily transported to different areas for bicycle storage. Further, if desired to provide added security, the base 24 may be secured in place by lag bolts, stakes, clamps or other suitable means to prevented unwanted removal of the assembly and secure it against high winds.

Having thus described an exemplary embodiment of the present invention, it should be noted by those skilled in the art that the within disclosures are exemplary only and that various other alternatives, adaptations and modifications may be made within the scope of the present invention. Thus, by way of example and not of limitation, if desired additional crossbars with bicycle support frames mounted thereon could be added within a suitably sized frame base and the size of the cover and cover supports suitably increased so that more than one row of bicycles could be stored within a single storage assembly. Accordingly, the present invention is not limited to the specific embodiments as illustrated herein.

What is claimed is:

1. A collapsible bicycle storage assembly comprising:
   a frame structure including at least one bicycle support means for supporting bicycles in the upright position;
   lock means associated with said bicycle support means for locking said bicycles to said frame structure;
   collapsible cover means mounted on said frame structure and movable between a collapsed position, and a covering position for entirely covering and protecting said bicycles;
   said frame structure including a horizontal base having two outwardly extending legs mounted at right angles to at least one cross piece, with at least one of said cross pieces having said bicycle supports mounted thereon;
   said collapsible cover means including a cover means for protecting the bicycles, a plurality of cover supports, each having a first end hinged to one of said base legs and a second end hinged to the other base leg by hinge means whereby said cover supports may be moved between said collapsed position where said cover supports are adjacent each other collapsed on said frame structure and a covering position where said cover supports are at spaced locations to support said cover over said bicycles;
   said frame structure and cover supports being made from lightweight plastic pipe;
   said plastic pipe being releasably connected together by press fittings which are standard plastic pipe connectors;
   said cover means being formed of lightweight flexible plastic sheet material; and
   said assembly including means for removably mounting said cover means on said cover supports.

2. A collapsible bicycle storage assembly according to claim 1 wherein the legs and cross piece of said base are in a U-shape.

3. A collapsible bicycle storage assembly according to claim 1 wherein said cover supports are U-shaped.

4. A collapsible bicycle storage assembly according to claim 1 wherein said hinge means includes a first and second hub each located at opposite mid-portions of said base legs, said first hub mounting the first ends of said cover supports and said second hub mounting the second ends of said cover supports, whereby said cover supports may be rotated about said hubs to said collapsed position and to said covering position.

5. A collapsible bicycle storage assembly according to claim 3 wherein said cover supports include four support members which are releasably connected together by connection means to form said cover support.

6. A collapsible bicycle storage assembly according to claim 1 wherein said legs and cross piece of said horizontal base are releasably connected to each other.

* * * * *